(12) United States Patent
Carloni et al.

(10) Patent No.: US 9,174,571 B2
(45) Date of Patent: Nov. 3, 2015

(54) TILT SWITCH AND LIGHTING ASSEMBLY FOR A VEHICLE COMPARTMENT

(75) Inventors: Shannon Carloni, Dearborn Heights, MI (US); Cornel Lewis Gardner, Romulus, MI (US); Megan Lovejoy, Dearborn, MI (US); Frederick A. Drapala, Canton, MI (US); Latasha Nicole Smith, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 312 days.

(21) Appl. No.: 13/591,502

(22) Filed: Aug. 22, 2012

(65) Prior Publication Data

US 2014/0056017 A1    Feb. 27, 2014

(51) Int. Cl.
*B60Q 1/00* (2006.01)
*B60Q 1/26* (2006.01)
*B60Q 3/02* (2006.01)
*B60R 7/06* (2006.01)

(52) U.S. Cl.
CPC .............. *B60Q 3/022* (2013.01); *B60Q 3/0296* (2013.01); *B60R 7/06* (2013.01)

(58) Field of Classification Search
CPC ........ B60Q 3/022; B60Q 3/06; B60Q 3/0293; B60R 7/06
USPC .................. 362/488, 155, 489, 548
See application file for complete search history.

(56) References Cited

U.S. PATENT DOCUMENTS

| | | | | |
|---|---|---|---|---|
| 5,202,559 A | * | 4/1993 | Durst | 250/231.1 |
| 5,209,343 A | * | 5/1993 | Romano et al. | 200/61.52 |
| 5,457,293 A | * | 10/1995 | Breed | 200/61.52 |
| 5,521,806 A | * | 5/1996 | Hutzel et al. | 362/486 |
| 6,005,205 A | * | 12/1999 | Chou | 200/61.45 M |
| 6,011,254 A | * | 1/2000 | Sano et al. | 250/231.1 |
| 6,543,147 B2 | * | 4/2003 | Akieda | 33/366.24 |
| 8,439,418 B1 | * | 5/2013 | Lovejoy et al. | 296/37.12 |
| 2003/0081411 A1 | * | 5/2003 | Noda et al. | 362/155 |
| 2010/0296304 A1 | * | 11/2010 | Hayes et al. | 362/488 |
| 2011/0121599 A1 | * | 5/2011 | Goupil et al. | 296/37.12 |

FOREIGN PATENT DOCUMENTS

| | | |
|---|---|---|
| DE | 19654802 C1 | 7/1998 |
| EP | 1550579 A1 | 7/2005 |
| IN | 2311CHE2008 A | 4/2010 |
| KR | 100972365 B1 | 7/2010 |

* cited by examiner

*Primary Examiner* — Thomas A Hollweg
*Assistant Examiner* — Kevin Quarterman
(74) *Attorney, Agent, or Firm* — Vichit Chea; Price Heneveld LLP

(57) ABSTRACT

A vehicle compartment has a housing defining a space and an access door pivotally coupled to the housing for pivoting between an open position and a closed position. Included is a light source for illuminating the space and a tilt switch provided on a circuit board coupled to the access door. The tilt switch is configured to have a first switch position when the access door is in the closed position and a second switch position when the access door is in the open position. The light source is activated when tilt switch is in the second switch position. The compartment may include a storage compartment, such as a glove box. The compartment may include an engine compartment.

21 Claims, 4 Drawing Sheets

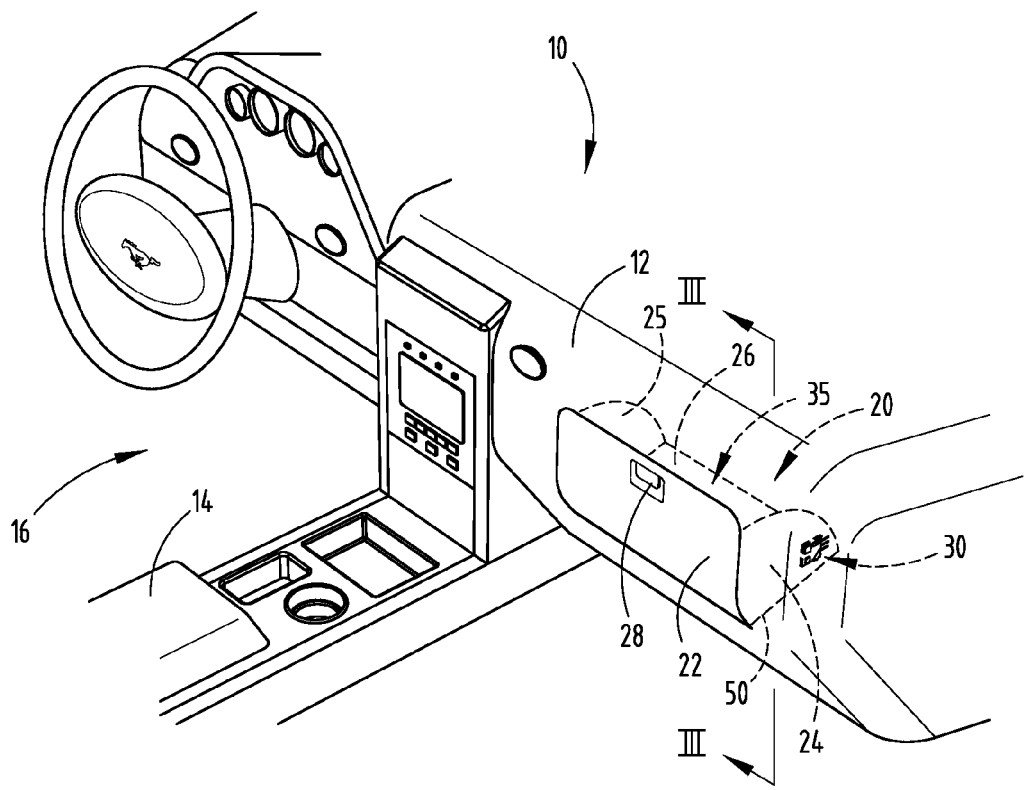
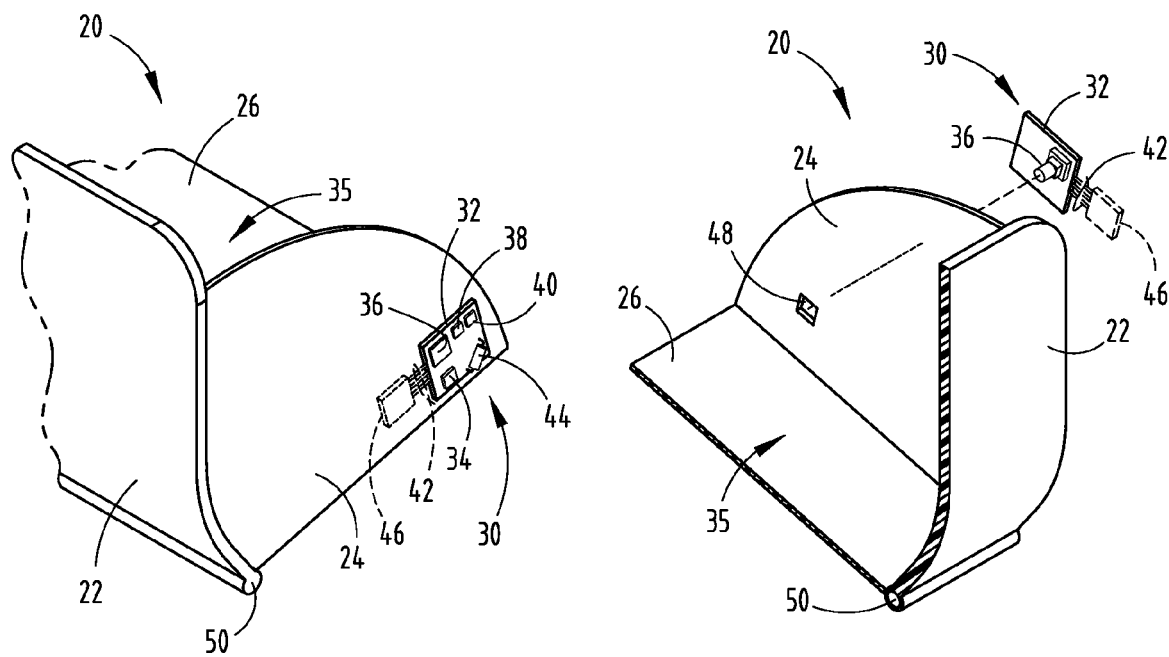
FIG. 1
FIG. 2
FIG. 2A

TILT SWITCH AND LIGHTING ASSEMBLY FOR A VEHICLE COMPARTMENT

FIELD OF THE INVENTION

The present invention generally relates to vehicle storage compartments, and more particularly relates to a switch controlled lighting assembly for illuminating a vehicle storage compartment.

BACKGROUND OF THE INVENTION

Automotive vehicles are commonly equipped with one or more storage compartments for storing items onboard the vehicle. Vehicles typically include a storage compartment referred to as a glove box located in the dashboard or panel at the front of the passenger compartment, generally on the front passenger side of the vehicle. The glove box storage compartment typically includes a storage area and an access door or lid that opens and closes to allow or prevent access to the storage area. Conventional vehicle glove boxes often employ one or more light sources, such as an incandescent lamp to provide light illumination when the access door is in the open position.

The glove box storage compartment lighting assembly typically employs a conventional plunger switch configured to automatically turn the light source on when the access door opens relative to the dashboard. The plunger switch typically employs a separate wire harness connected between the light source and the switch to accommodate optimum positioning of the light and switch assemblies. It is desirable to provide for a lighting arrangement in a vehicle storage compartment that reduces the complexity of the wiring and components assembled thereto.

SUMMARY OF THE INVENTION

According to one aspect of the present invention, a vehicle compartment is provided. The vehicle compartment includes a housing defining a space and an access door pivotally coupled to the housing for pivoting between an open position and a closed position. The vehicle compartment also includes a light source for illuminating the space. The vehicle compartment further includes a tilt switch operatively coupled to the access door and configured to activate the light source when the access door is in the open position.

According to another aspect of the present invention, a vehicle storage compartment is provided. The vehicle storage compartment includes a housing defining a space and an access door pivotally coupled to the housing for pivoting between an open position and a closed position. The compartment also includes a circuit board operatively coupled to the access door. The compartment further includes a light source assembled to the circuit board for illuminating the space. The compartment also includes a tilt switch assembled to the circuit board and configured to have a first switch position when the access door is in the closed position and a second switch position when the access door is in the open position. The light source is activated when the tilt switch is in the second switch position.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 1 is a perspective view of a vehicle passenger compartment equipped with a glove box storage compartment having a lighting assembly with a tilt switch, according to one embodiment;

FIG. 2 is an enlarged partial perspective view of the glove box tray with access door and housing walls and illustrating the tilt switch and lighting assembly;

FIG. 2A is an enlarged inside perspective view of the tray further illustrating the tilt switch and lighting assembly;

DETAILED DESCRIPTION OF THE PREFERRED EMBODIMENTS

Figure 3:
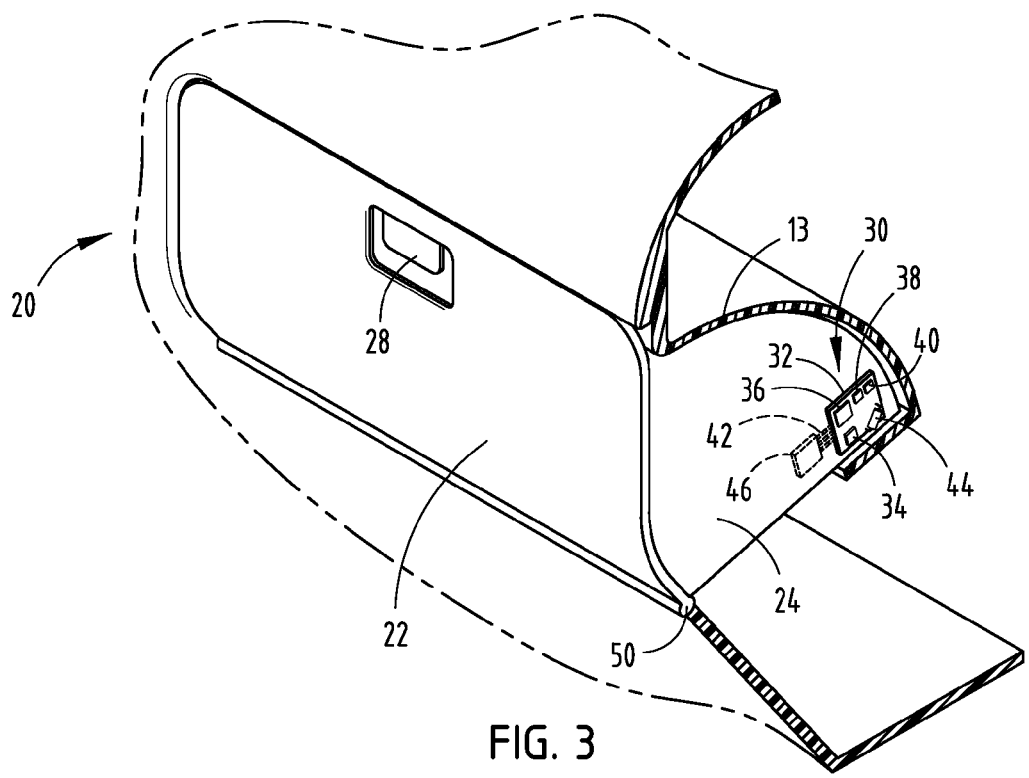
FIG. 3 is a perspective cut-out view of the glove box storage compartment shown in the closed position.

For purposes of description herein, the terms "upper," "lower," "top," "bottom," "right," "left," "rear," "front," "vertical," "horizontal," and derivatives thereof shall relate to the glove box storage compartment and tilt switch and lighting assembly as oriented in FIGS. 1 and 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-4A, the front portion of a passenger compartment 16 of an automotive vehicle 10 is generally illustrated having a glove box storage compartment 20, according to one embodiment. The glove box storage compartment 20 is integrated into a dash panel or dashboard 12 of the vehicle 10, generally at a location forward of a front seated passenger in the vehicle 10. The vehicle 10 is also shown including other compartments including a center console/arm rest storage compartment 14 located between driver and passenger seating areas. The vehicle 10 may further be equipped with other compartments including an engine compartment having a hood panel that pivots between open and closed positions and a trunk that has a rear pivoting lid.

The vehicle glove box storage compartment 20 in the embodiment shown includes a tray pivotally connected within an opening of the dashboard 12. The tray includes walls that include a housing defining a storage space 35 and includes an access door that opens to allow access to the storage space and closes to prevent access to or exiting from the storage compartment. The tray includes a front access door 22, lateral side walls 24 and 25, and bottom wall 26. The dash panel 12 includes an arcuate wall 13 that covers the top and rear portions of the storage space 35. In the embodiment shown, the access door 22 is part of a tray that pivots about pivot rod 50 forward and outward relative to the dashboard. However, it should be appreciated that the glove box storage compartment 20 may employ a fixed tray or shelving arrangement having an access door that pivots relative to the shelf or tray, according to other embodiments. The access door 22 has a latch 28 aligned to engage a connector on the dashboard 12 to secure the access door 22 in a closed position. It should be appreciated that other access door and securement mechanisms may be employed to control access to the storage compartment 20.

The storage compartment 20 includes a tilt switch and light assembly 30 shown having a light source 30, tilt switch 44 and other compartments mounted on a circuit board 32. The light source 36 provides light illumination to the storage compartment when the access door 22 is in the open position. The light source 36 may include a single light emitting diode (LED), according to one embodiment. According to another embodiment, a plurality of LEDs may be employed as the light source 36. Other light sources may be employed along with various lighting configurations such as light pipes and optical lenses.

The circuit board 32 is assembled to side wall 24 of the tray. In addition, the tilt switch 44 is also mounted to the circuit board 32 and thus is mounted to the side wall 24 of the tray. The tilt switch 44 thus is operatively coupled to the access door 22 and is configured to have a first switch position when the access door 22 is in the closed position and a second switch position when the access door 22 is in the open position. The light source 36 is activated when the tilt switch 44 is in the second position so as to illuminate the storage compartment when the access door 22 is in the open position. When the access door 22 and associated tray is moved to a closed position, the tilt switch 44 deactivates the light source 36.

The circuit board 32 may further include other components 34, 38 and 40, such as a capacitors, resistors, regulators, diodes and other circuit components and has connector wires 42 that lead to a power connector 46. Power connector 46 may be connected to the vehicle power supply to supply power to the light source 36 to illuminate the compartment when the tilt switch 44 is in the second position. The light source 36 extends from one side of circuit board 32 through an opening 48 which serves as a light shield to allow light to illuminate into the storage compartment space. A light guide may further be operatively coupled to the light source 36 to guide the light emitted by light source 36 into the storage space in a desired optical illumination manner.

The tilt switch 44 provides an output indicative of its sensed angular orientation. The tilt switch 44 may also be referred to as an attitude switch which provides an angular output dependent upon its angular orientation relative to gravitational force. The tilt switch 44 may employ a steel ball that rolls on a surface within a housing and changes position relative to a diode or other sensing element due to the angular position and gravity, according to one embodiment. The ball may be in a first position when the angle is around zero degrees and may roll to a second position such as around thirty degrees and a third position such as around fifteen degrees. According to one embodiment, the tilt switch 44 may include a conventional tilt switch such as Model No. AG1260-1 or Model No. AG3010, both commercially available from Comus International.

Figure 3A:
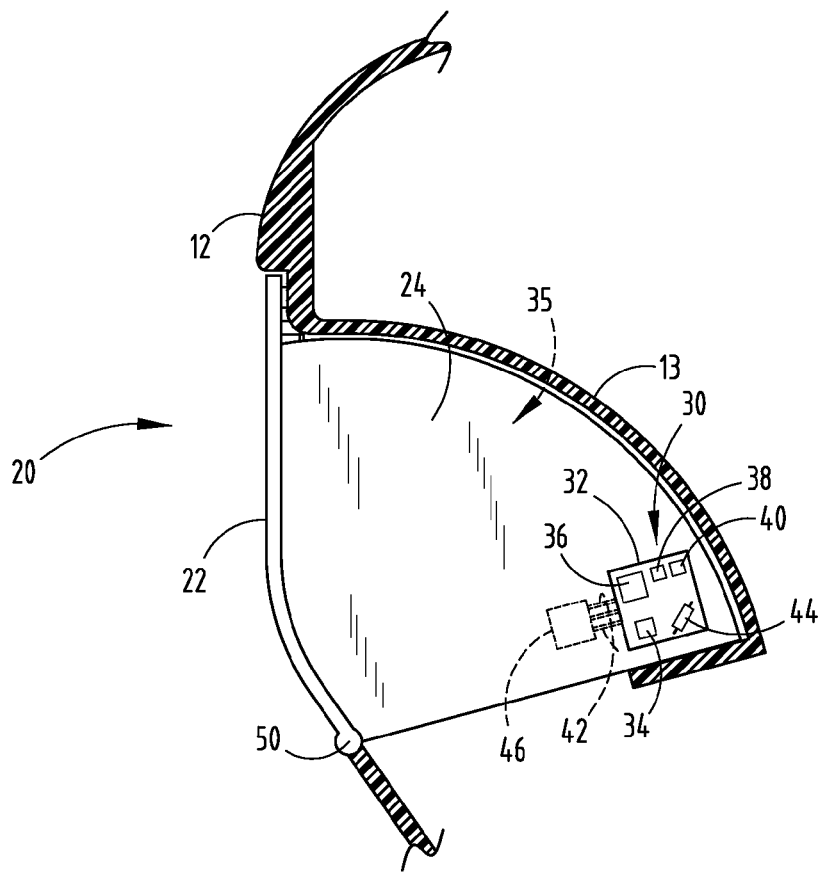
FIG. 3A is side view of the glove box storage compartment shown in the closed position.
Figure 4:
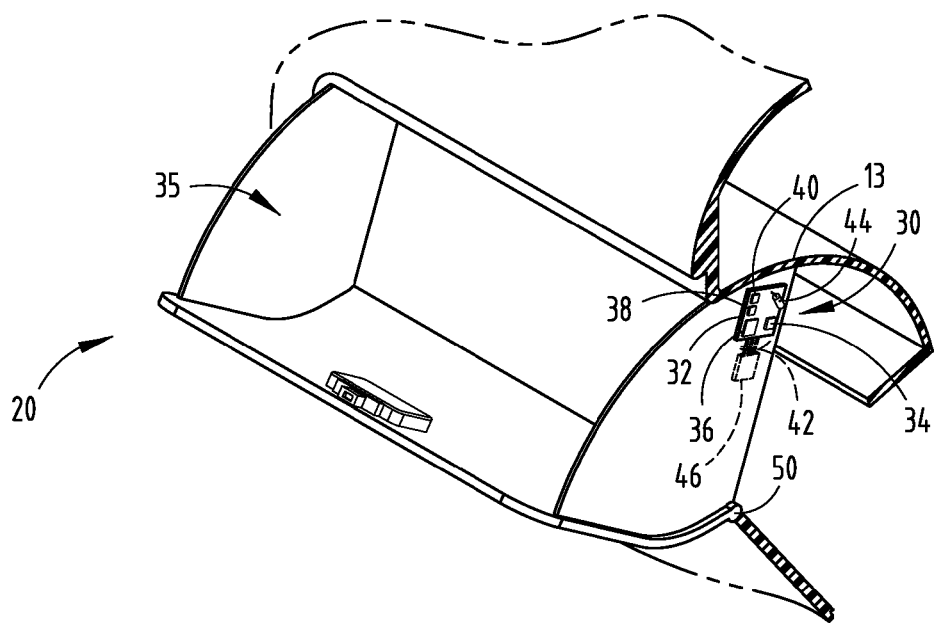
FIG. 4 is a perspective cut-away view of the glove box storage compartment shown in the open position.
Figure 4A:
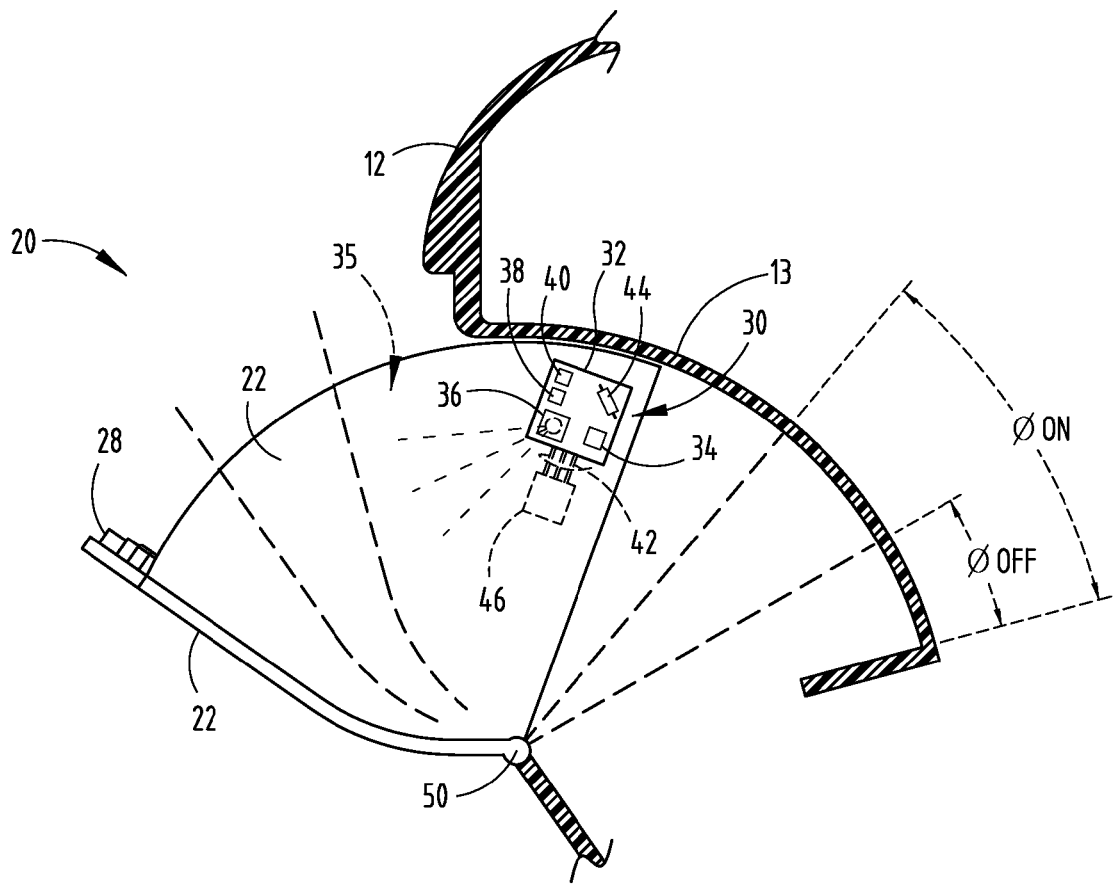
FIG. 4A is a side view of the glove box storage compartment shown in the open position.

Referring to FIGS. 3 and 3A, the access door 22 and associated tray are shown in the closed position in which the storage space is not accessible from outside and the light source 36 is turned off. As seen in FIGS. 4 and 4A, the access door 22 and its associated tray is pivoted outward by a sufficient angle so as turn on the light source 36 to provide light illumination to the storage space 36. In the open position, the tilt switch 44 is rotated by a sufficient angle in the counterclockwise direction as seen in FIG. 4A. When the angle of rotation exceeds an activation angle $\phi_{ON}$, the light source 36 is turned on. When the access door 22 and tray are rotated clockwise back toward the closed position and reach a deactivation angle $\phi_{OFF}$, the light source 36 is turned off. According to one embodiment, the activation angle $\phi_{ON}$ may be about 30 degrees, plus or minus 5 degrees, and the deactivation angle may be about 15 degrees. Thus, by requiring a larger activation angle $\phi_{ON}$ than the deactivation angle $\phi_{OFF}$, hysteresis is provided so as to prevent unwanted repeated activation/deactivations of the light source 36 when the access door 22 is only partly opened. By providing an activation angle $\phi_{ON}$ greater than 25 degrees, the vehicle may be driven or parked on an incline at a sleep angle without concern that the lighting source 36 may be turned on while the glove box access door 22 is closed.

In the embodiment shown and described herein, the light source 36 and tilt switch 44 are located on a circuit board 32 on a side wall of a tray operatively coupled to the access door 22. However, it should be appreciated that the circuit board 32 and the associated components may be located on the access door 22 or another surface operatively coupled to the access door 22. By controlling the light source 36 based on angle of the access door 22 as determined by the tilt switch 44, the requirement for a plunger switch is eliminated, thereby simplifying the cost and assembly of the switch and lighting assembly 30.

Figure 5:
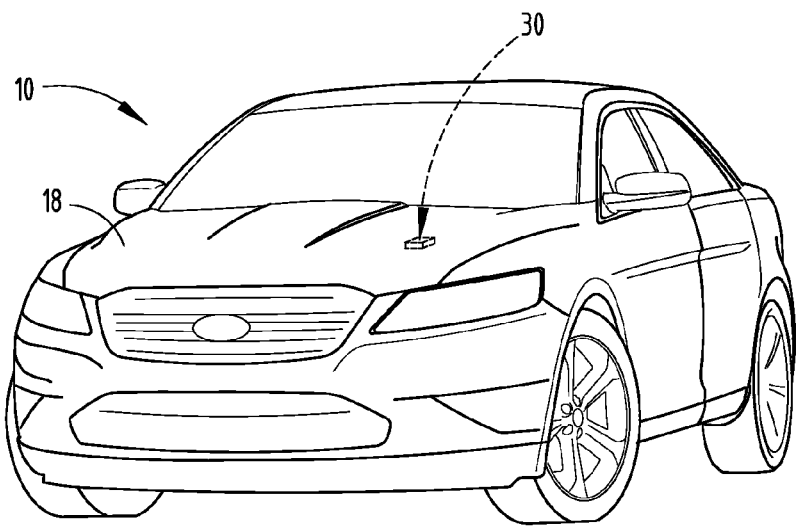
FIG. 5 is a front perspective view of an automotive vehicle having a tilt switch and lighting assembly mounted to the hood in the engine compartment, according to another embodiment.
Figure 5A:
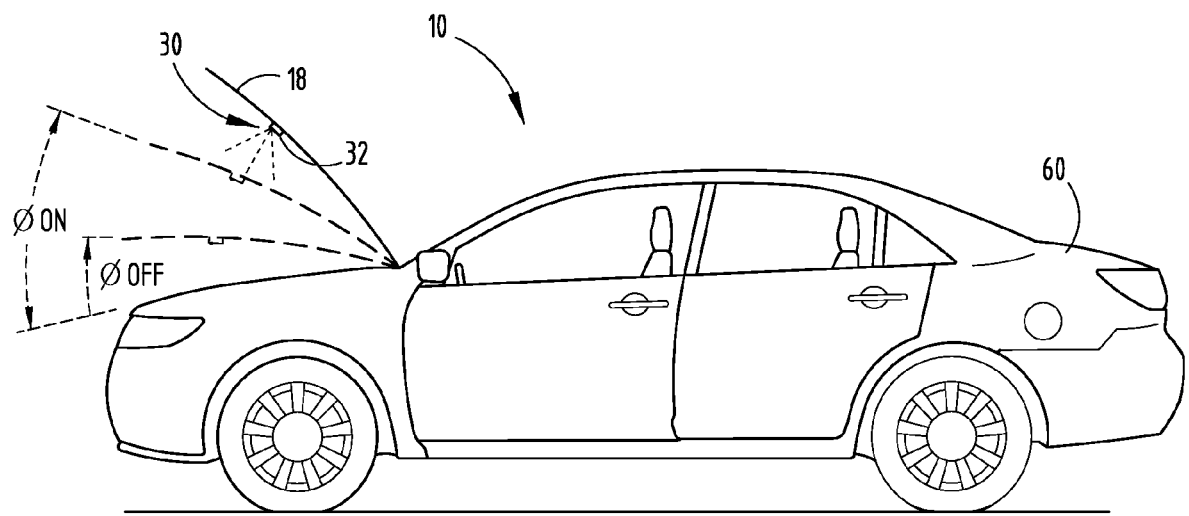
FIG. 5A is a side view of the vehicle illustrating the tilt switch and lighting assembly with the hood in the open position.

Referring to FIGS. 5 and 5A, the tilt switch and light assembly 30 is shown located on a vehicle engine compartment which generally includes body panels and a hood panel 18 defining walls of the engine compartment. In this embodiment, the tilt switch and light assembly 30 is operatively assembled to the vehicle hood panel 18 which pivots between an open position shown in FIG. 5A and a closed position shown in FIG. 5. When the vehicle hood panel 18 is opened to or greater than the activation angle $\phi_{ON}$ as determined by the tilt switch, the light source is turned on to provide light illumination to the engine compartment. When the hood panel 18 is closed sufficiently to an angle less than the deactivation angle $\phi_{OFF}$ as determined by the tilt switch, the light source is turned off. As such, the requirement for a separate plunger switch is eliminated. It should further be appreciated that the tilt switch and light assembly 30 may be employed to provide light control for other compartments having an access door that pivots between and open and closed position, such as a center console storage compartment 14 and vehicle trunk compartment 60.

Control circuitry 100 may be employed for controlling the light source based on the sensed position of the tilt switch according to one embodiment. The control circuitry may include a microcontroller or other circuitry for sensing the position of the tilt switch and controlling activation of the light source. The tilt switch switches between an open position and a closed position based on the angular orientation of the switch. When the tilt switch is in the open position indicative of the access lid in the closed position, electrical power is not supplied to the light source so as to deactivate the light source. When the tilt switch is in the closed position indicative of the access door in the open position, electrical power is supplied to the light source to activate the light source and thereby illuminate the compartment.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A vehicle compartment comprising:
a housing defining a space;
an access door pivotally coupled to the housing for pivoting between open and closed positions;
a light source for illuminating the space;
a tilt switch operatively coupled to the access door to activate the light source when the access door is rotated 25 to 35 degrees to the open position and deactivate the light source when the access door is rotated less than 25 degrees; and
a circuit board, wherein the light source and the tilt switch are located on the circuit board.

2. The compartment of claim 1, wherein the light source comprises at least one light emitting diode.

3. The compartment of claim 1, wherein the compartment is a storage compartment.

4. The compartment of claim 3, wherein the storage compartment is a glove box.

5. The compartment of claim 4, wherein the housing comprises a pivoting tray comprising a plurality of walls, wherein the tilt switch is mounted on at least one wall.

6. The compartment of claim 5, wherein the access door is provided as a front wall of the tray.

7. The compartment of claim 1, wherein the compartment comprises an engine compartment, wherein the access door comprises a hood panel.

8. The compartment of claim 1, wherein the tilt switch is rotated in the range of 25 to 35 degrees from the closed position to the open position to activate the light source.

9. The compartment of claim 1, wherein the tilt switch comprises a ball that rolls on a surface and changes position relative to a sensor due to angular position and gravity.

10. A vehicle compartment comprising:
a housing defining a space;
an access door pivotally coupled to the housing for pivoting between an open position and a closed position;
a circuit board operatively coupled to the access door such that the circuit board pivots with the access door;
a light source assembled to the circuit board for illuminating the space; and
a tilt switch assembled to the circuit board and configured to have a first switch position when the access door is in the closed position and a second switch position when the access door is in the open position, wherein the light source is activated when the tilt switch is rotated by 25 to 35 degrees from the first switch position to the second switch position and is deactivated when the tilt switch is rotated less than 25 degrees to provide hysteresis.

11. The compartment of claim 10, wherein the light source comprises at least one light emitting diode.

12. The compartment of claim 10, wherein the compartment is a storage compartment.

13. The compartment of claim 12, wherein the storage compartment is a glove box.

14. The compartment of claim 13, wherein the housing comprises a pivoting tray comprising a plurality of walls, wherein the tilt switch is mounted on at least one wall.

15. The compartment of claim 14, wherein the access door is provided as a front wall of the tray.

16. The compartment of claim 10, wherein the compartment comprises an engine compartment, wherein the access door comprises a hood panel.

17. The compartment of claim 10, wherein the tilt switch comprises a ball that rolls on a surface and changes position relative to a sensor due to angular position and gravity.

18. A vehicle engine compartment comprising:
a housing defining a space;
a hood panel pivotally connected to the housing for pivoting between opened and closed positions;
a circuit board mounted to the hood panel:
a light source mounted to the circuit board for illuminating the engine compartment space; and
a tilt switch mounted to the circuit board and configured to activate the light source when the hood panel is in the open position.

19. The compartment of claim 18, wherein the light source is activated when the hood panel rotates greater than 25 degrees from the closed position and is deactivated when the hood panel is rotated less than 25 degrees from the closed position.

20. The compartment of claim 19, wherein the light source is activated when the hood panel is rotated in the range of 25 to 35 degrees from the closed position to the open position.

21. The compartment of claim 18, wherein the tilt switch comprises a ball that rolls on a surface and changes position relative to a sensor due to angular position and gravity.

* * * * *